United States Patent
Turek et al.

(10) Patent No.: US 6,477,408 B1
(45) Date of Patent: Nov. 5, 2002

(54) ANALYSIS OF MUSCULAR ACTIVITY IN NEONATAL ANIMALS TO SCREEN FOR MUTATIONS AND/OR DRUGS THAT ALTER SLEEP AND WAKE STATES

(75) Inventors: Fred W. Turek, Chicago, IL (US); Christine Dugovic, Chicago, IL (US)

(73) Assignee: Northwestern University, Evanston, IL (US)

( * ) Notice: Subject to any disclaimer, the term of this patent is extended or adjusted under 35 U.S.C. 154(b) by 41 days.

(21) Appl. No.: 09/801,305

(22) Filed: Mar. 7, 2001

Related U.S. Application Data (60) Provisional application No. 60/187,598, filed on Mar. 7, 2000.

(51) Int. Cl.$^7$ ............................................. A61B 5/04
(52) U.S. Cl. .................................... 600/546; 600/544
(58) Field of Search ............................. 600/300, 301, 600/544, 546, 587, 595, 26; 128/898

(56) References Cited

U.S. PATENT DOCUMENTS 3,774,593 A * 11/1973 Hakata et al. ............... 600/544
5,732,696 A * 3/1998 Rapoport et al. ........... 600/301
6,114,326 A * 9/2000 Schueler ...................... 514/220
6,277,864 B1 * 8/2001 Mondadori et al. ......... 514/317

OTHER PUBLICATIONS

Marcos G. Frank, et al., "Effects of Sleep Deprivation in Neonatal Rats." *AJP–Regulatory, Integrative and Comparative Physiology*, Jul. 1998, pp. R148–R157, vol. 275, Issue 1, The American Physiological Society.

Paul Franken, et al., "Genetic Variation in EEG Activity During Sleep in Inbred Mice." *AJP–Regulatory, Integrative and Comparative Physiology*, Oct. 1998, pp. R1127–R1137, vol. 275, Issue 4, The American Physiological Society.

Daniele Jouvet–Mounier, et al., "Ontogenesis of the States of Sleep in Rat, Cat, and Guinea Pig During the First Postnatal Month." *Developmental Psychobiology*, Oct. 1969, pp. 216–239, vol. 2, Issue 4, John Wiley & Sons, Inc.

* cited by examiner

*Primary Examiner*—Kevin Shaver
*Assistant Examiner*—Charles Marmor, II
(74) *Attorney, Agent, or Firm*—Reinhart, Boerner, Van Deuren, s.c.

(57) ABSTRACT

Methods relating to the use of neonatal animals to identify sleep wake states in the corresponding adults and/or phenotypically characterize such adults.

18 Claims, 8 Drawing Sheets

|  |  | Number of episodes | | Duration of episodes (min) | |
|---|---|---|---|---|---|
|  |  | WIS | WKY | WIS | WKY |
| W | neonates | 61 ± 6 | 72 ± 5 | 0.8 ± 0.1 | 0.4 ± 0.0 * * * |
|  | adults | 109 ± 5 | 151 ± 4 * * * | 2.0 ± 0.1 | 1.5 ± 0.1 * * * |
| QS<br>NREMS | neonates<br>adults | 107 ± 4<br>112 ± 4 | 122 ± 5 *<br>157 ± 4 * * * | 0.6 ± 0.0<br>3.9 ± 0.2 | 0.4 ± 0.0 * *<br>2.6 ± 0.1 * * * |
| AS<br>REMS | neonates<br>adults | 78 ± 4<br>34 ± 1 | 107 ± 4 * * *<br>52 ± 2 * * * | 0.9 ± 0.0<br>2.1 ± 0.1 | 1.0 ± 0.1<br>2.0 ± 0.0 |

|   |          | Number of episodes | | Duration of episodes (min) | |
|---|----------|---------|-------------|---------|-------------|
|   |          | WIS     | WKY         | WIS     | WKY         |
| W | neonates | 61 ± 6  | 72 ± 5      | 0.8 ± 0.1 | 0.4 ± 0.0 *** |
|   | adults   | 109 ± 5 | 151 ± 4 *** | 2.0 ± 0.1 | 1.5 ± 0.1 *** |
| QS NREMS | neonates | 107 ± 4 | 122 ± 5 * | 0.6 ± 0.0 | 0.4 ± 0.0 ** |
|   | adults   | 112 ± 4 | 157 ± 4 *** | 3.9 ± 0.2 | 2.6 ± 0.1 *** |
| AS REMS | neonates | 78 ± 4 | 107 ± 4 *** | 0.9 ± 0.0 | 1.0 ± 0.1 |
|   | adults   | 34 ± 1  | 52 ± 2 ***  | 2.1 ± 0.1 | 2.0 ± 0.0 |

|  |  | Number of episodes | | Duration of episodes (min) | |
| --- | --- | --- | --- | --- | --- |
|  |  | WIS | WKY | WIS | WKY |
| W | light | 118 ± 8 | 144 ± 7* | 1.8 ± 0.1 | 1.3 ± 0.0*** |
|  | dark | 123 ± 3 | 156 ± 4*** | 3.6 ± 0.1 | 3.0 ± 0.1*** |
| SWS1 | light | 100 ± 4 | 95 ± 5 | 0.9 ± 0.0 | 0.7 ± 0.0*** |
|  | dark | 82 ± 2 | 91 ± 3* | 0.8 ± 0.0 | 0.7 ± 0.0* |
| SWS2 | light | 129 ± 5 | 166 ± 4*** | 2.7 ± 0.2 | 2.1 ± 0.1* |
|  | dark | 112 ± 4 | 144 ± 2*** | 1.6 ± 0.1 | 1.1 ± 0.0*** |
| REM sleep | light | 41 ± 2 | 63 ± 2*** | 2.0 ± 0.1 | 1.9 ± 0.1 |
|  | dark | 26 ± 2 | 29 ± 2 | 1.4 ± 0.1 | 1.2 ± 0.1 |

FIGURE 7

ANALYSIS OF MUSCULAR ACTIVITY IN NEONATAL ANIMALS TO SCREEN FOR MUTATIONS AND/OR DRUGS THAT ALTER SLEEP AND WAKE STATES

This application claims benefit of U.S. Provisional Application No. 60/187,598 filed Mar. 7, 2000.

The United States Government has certain rights to this invention pursuant to Grant Nos. HL/ML RO1-59598, T32-HL-07909 and RO-AG-18200-01 to Northwestern University.

BACKGROUND OF THE INVENTION

In adult animals the only way to accurately determine and characterize vigilance states (i.e. wake and the two primary stages of sleep, Rapid Eye Movement (REM) and non-Rapid Eye Movement (NREM) sleep, is to monitor electroencephalographic (EEG) and electromyographic (EMG) activity using chronic electrodes previously implanted under deep anesthesia. For studies in animals this typically requires extensive surgical procedures making it very expensive and time consuming to record EEG and EMG sleep from a large number of animals.

Neonatal sleep has been characterized both in humans and non-human mammalian species. Because EEG activity appears undifferentiated in the early postnatal period, characterization of neonatal sleep has depended on behavioral criteria. Two distinct types of behavioral sleep are scored in neonatal mammals. Active Sleep (AS) is characterized by phasic motor activity including numerous muscular twitches, REM and irregular respiration. AS has been assumed to represent an immature form of REM sleep. Quiet Sleep (QS) is behaviorally defined as periods of relative motor quiescence coupled with regular respiration and is thought to represent an immature form of NREM sleep or slow wave sleep (SWS) that appears later in the postnatal period (Jouvet-Mounier et al.,1970; Roffwarg et al., 1966). AS occupies a large proportion of sleep time in the neonate and then declines progressively with maturation. In contrast, QS initially occupies a very small portion of the neonatal sleep record and gradually increases with postnatal development.

There has been an ongoing controversy as to whether or not AS and QS in neonates are homologous to the EEG-defined REM sleep and NREM sleep, respectively in adult animals (Frank and Heller, 1997a). Nevertheless, AS in neonates and REM sleep in adult animals are behaviorally characterized by muscular atonia, irregular respiration and REM. Consequently, neonatal AS and REM sleep in adult mammals are often considered to be homologous sleep states. In rats, the appearance of an EEG identifiable REM sleep-like state in the second postnatal week (Jouvet-Mounier et al., 1970; Gramsbergen, 1976) is followed by the appearance of diurnal and homeostatic sleep regulatory mechanisms in the 3–4$^{th}$ postnatal weeks (Alfoldi et al., 1990; Frank and Heller, 1997b). In adult mammals, the sleep-wake distribution across the circadian day is regulated by an endogenous oscillator located within the hypothalamic suprachiasmatic nuclei (SCN). In the rat, endogenous SCN rhythms are first detected in the fetal period (Reppert et al., 1988) but do not couple to sleep-wake cycles until the 3$^{rd}$ postnatal week (Jouvet-Mounier et al., 1970).

Because sleep-wake states are exceedingly difficult to characterize by the EEG activity before the 9$^{th}$ day of life in rats (Jouvet-Mounier et al. 1970; Gramsbergen, 1976), the EEG and EMG recordings are often combined with registration of movements by an actograph and/or observation of behavior to determine the vigilance state, i.e. wake, AS and QS. When awake, the rat pup is almost never still. QS is characterized by motionless interrupted by startles (sudden phasic contractions of body muscles), while AS is characterized by intense twitching of the musculature.

A selective investigation on evolution of muscular twitches during the 21 postnatal days of the rat pups indicates an age-dependent progression of these twitches. (Lapointe and Nosal, 1979) During the 21 days of the pre-weaning period, the rat pups exhibit brief muscular twitches of variable intensity which occur in different body regions (head, limbs, dorsal and ventral region, tail). The muscular twitches are abundant in the first 10 days of postnatal life. Thereafter they progressively decrease until the 13$^{th}$ day and then fall abruptly until day 17. The disappearance of muscular twitches coincides with a progressive increase in more elaborated behavioral activities (e.g. motility and exploration) and with the maturity of the sense organs (eyes and ears). This evolution parallels the gradual changes taking place in the sleep-wake states during the postnatal developing rat.

Even so, it is difficult, at best, to screen a large number (upwards of thousands) of animal subjects because of the time-consuming and costly nature of recording sleep via brain electrical activity in adult animals. It is necessary to determine not only wake from sleep but also to differentiate the two primary sleep states: rapid eye movement (REM) sleep and non-REM (NREM) sleep from one another. This is a difficult task in view of the time and money it takes to perform surgery, allow for recovery and adaptation to recording conditions before collecting EEG and EMG recordings for many hours in adult animals.

DETAILED DESCRIPTION OF THE DRAWINGS

*p<0.05; ***p<0.001 (unpaired two-tailed Student t-test) for between-groups comparisons.

SUMMARY OF INVENTION

In light of the foregoing, it is an object of the present invention to provide one or more methods relating to the use of neonatal rodent pups and their associated sleep-wake states to characterize adult rodent animals and/or identify corresponding sleep-wake states associated therewith, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to screen wake and two primary sleep states, REM sleep and NREM sleep, such screening as can be accomplished by recording only muscular activity in neonatal rodents. It is a corresponding object to distinguish in such neonatal rodents active sleep (analogous to REM sleep in adults) from quiet sleep (analogous to NREM sleep in adults) from a wake state.

It can also be an object of the present invention to demonstrate that alterations observed in sleep characteristics in neonatal rodents are consistent with those observed in adult animals matured therefrom, such objectives in accordance with the broader aspects of this invention and as can be met in conjunction with one or more other objectives described herein.

Accordingly, it can also be an object of the present invention to provide one or more methodologies whereby it can be demonstrated that the behavioral states in an earlier neonatal period are at some fundamental level related to the more mature states of REM and NREM sleep in adult animals. As a corollary thereto, it can be a further object of the present invention to demonstrate that genetic differences in sleep architecture observed in adult animals can be evidenced in neonatal animals.

It can also be an object of the present invention, accordingly, to provide a non-invasive approach for analyzing sleep stages, an approach which allows for the subject rodent pups to be returned to their home cage, after testing/recording, without adverse effect on future development, such that the animals can be maintained until adulthood when more classical testing protocols can be used to further monitor and/or characterize sleep architecture. Accordingly, it can be a related object of this invention to provide methodologies whereby neonatal test animals can be maintained through adulthood and retested for other phenotypic screening purposes.

It can also be an object of the present invention to screen for abnormal sleep in the neonate by way of detecting genetic differences prior to any environmental adaptation occurring during the development of sleep mechanisms into adulthood.

It can be a further object of the present invention to provide a general methodology whereby the characteristics of sleep structure and architecture can be obtained in the neonate in only a fraction of the time otherwise needed for adult testing, such a method as can be applied to large scale screening procedures with a savings of both cost and time.

It can also be an object of the present invention to provide a general methodology for the longitudinal study of test and control populations, such that it can be demonstrated that genetic differences in sleep architecture observed in adult animals are present in the neonate matured therefrom.

Other objects, features, benefits and advantages of the present invention will be apparent from this summary and its descriptions of various preferred embodiments, and will be readily apparent to those skilled in the art having knowledge of various physiological electrographic data, use and interpretation, together with animal screening techniques. Such objects, features, benefits and advantages will be apparent from the above as taken into conjunction with the accompanying examples, data, figures and all reasonable inferences to be drawn therefrom, alone or in consideration of the claims appended hereto.

In part, the present invention is a method of using a neonatal rodent pup to identify sleep-wake states in an adult rodent animal. Such a method includes (1) providing at least one neonatal rodent pup and recording its electromuscular activities; (2) assigning a sleep-wake state to each electromuscular activity; and (3) identifying an adult rodent animal having such an assigned sleep-wake state, the adult rodent maturable from the neonatal rodent originally assigned the sleep-wake state. In preferred embodiments, various sleep-wake states known in the art and as otherwise described herein are assigned by comparing neonatal and adult populations of test rodents with, respectively, neonatal and adult populations of control rodents. Irrespective of such a comparison, a preferred embodiment of this method can also include recording of muscular activity by electromyography.

As mentioned above, various sleep-wake states are useful in conjunction with this invention; however, preferred embodiments include assigned sleep-wake states selected from a group consisting of active sleep, quiet sleep and a wake state. Such assigned states can further include sleep fragmentation. As discussed more thoroughly below, adult rodent animals can be identified by one or more of the following sleep-wake states: increased total active sleep time, increased active sleep as a percentage of total sleep time, decreased quiet sleep time and increased sleep fragmentation. As would be known to those skilled in the art made aware of this invention, various other sleep-wake states or variations thereof can be used in conjunction with neonatal rodent assignment and/or subsequent identification of a corresponding adult rodent. Regardless, adult identification can be confirmed with subsequent physiological electrographic data collection from adult rodents, such data including but not limited to electroencephalograms, electromyograms and combinations thereof.

In part, the present invention also includes a method of using neonatal rodent pups to identify adult rodent phenotypes. Such a method includes (1) providing neonatal rodent pups and recording their electromuscular activities by electromyography; (2) assigning a sleep-wake state to an electromuscular activity including but not limited to active sleep, quiet sleep and a wake state; (3) identifying an adult rodent phenotype in a neonatal rodent pup corresponding to at least one assigned sleep-wake state; and (4) confirming the phenotype with a subsequent test on adult rodents matured from the neonatal rodent pups. As discussed above, each sleep-wake state can be assigned by an appropriate comparison between test and control neonatal/adult populations.

In part, the present invention can also include a method of using sleep-wake states to characterize abnormal sleep in mammals. Such a method can include (1) providing a population of control mammals and a population of test mammals with the test mammals having an abnormal sleep phenotype relative to the control mammals; (2) collecting physiological electrographic data from each of the test and control populations; (3) assigning sleep-wake states to the collected data; (4) comparing the assigned sleep-wake states of the test mammals with the assigned sleep-wake states of the control mammals; and (5) identifying differences between each assigned sleep-wake states characteristic of the test mammal abnormal sleep phenotype. As described below, a phenotype generally described as depressive behavior is one such abnormal sleep phenotype. Regardless, such a sleep disorder can be identified in neonatal rodent pups through use of the present invention, by electromyographically recording electromuscular activities and assigning a sleep-wake state to each such recorded activity. A preferred embodiment of such a method utilizes Wistar rats as control mammals and Wistar Kyoto rats as test mammals.

In accordance with the present invention, electromyography can be used to record electromuscular activity. However, the present invention separately contemplates the alternative use of other measurements of muscular activity, including for instance the sensitive measurements of partial or total body movement, as has been demonstrated with neonatal rodent pups in the prior art outside the context of this invention.

At the present time, neonatal animals are not used for the screening of novel compounds that might influence sleep and wake states. The major reason for this is that sleep and wake are considered to be properties of complex neural networks and in neonatal animals these neural systems are not well developed. Thus the focus of drug development for new sleep/wake inducing compounds is on neurotransmitter/neuropeptide systems that are fully developed in adult but not neonatal mammals. Sleep is a property of intracellular events and that in the near future intracellular events will be the target of gene discovery for sleep/wake states.

Furthermore, preliminary data indicate that sleep-wake state in the neonatal animals do represent at the molecular genetic level sleep-wake states in the adult animals, and thus neonatal animals can be used for drug discovery; particularly in high-throughput screens for sleep and wake-inducing compounds and in general for drugs that can alter sleep or wake.

The present invention can be extended for application to the analysis of muscular activity for screening novel drugs that influence sleep and wake states in neonatal animals. Because of the unique presence of abundant muscular twitches during AS which are reflected on EMG activity, this criterion allows for the clear recognition of AS from QS during the first ten days of age. As opposed to the EMG analysis, behavioral observations (e.g. by video camera) are not precise enough to perceive small twitches and to appreciate the level of the general muscular tone which is low in QS and flat in AS. In addition, the EMG signal can be processed on-line for automatic analysis of sleep-wake states and other parameters.

At the present time no technology exists that would allow for the scoring of wake and sleep states in mammals in such a cost effective manner. The present invention will open up new avenues of research, and also represents a novel technology for monitoring sleep in a number of animals that is orders of magnitude better, both in terms of time and cost, then presently available technologies. In addition, the measurement of muscular activity via the EMG or other movement detection procedures provides a signal which is easier for automatic analysis than the EEG signal.

It should be noted that while EMGs have previously been recorded in neonatal rats, there is no reference in the literature to the effect that (1) the EMG alone can be used to screen for sleep phenotype abnormalities in animals, or (2) that using just the EMG can be an effective way to screen for new drugs that influence wake and sleep states. Furthermore, this invention demonstrates for the first time that EMG recording can be used to monitor sleep-wake states in mice, the species of choice when applying forward genetic approaches for finding genes based on altered phenotype, and a species that is likely to be used for the discovery for new sleep and wake promoting drugs.

It should also be noted that this inventive approach allows screening for altered sleep phenotype, and ultimately altered sleep genes at a very early age which is highly cost effective. Also, this "non-invasive" approach for scoring sleep stages allows for the use of animals for other phenotypic screening purposes, something which is difficult after the invasive surgery needed for EEG recording.

Accordingly, animals can be screened for drugs that promote wake and/or sleep, and it can be possible to screen in a time and cost effective manner thousands of drugs in a single year. Furthermore, those drugs which influence sleep and/or wake state in neonates can then be tested in adulthood when regular EEG sleep can be monitored to further analyze sleep in more detail, e.g. circadian rhythm of sleep-wake states, analysis of EEG signal including power spectral analysis. This unique approach will greatly enhance the ability to find novel compounds that influence sleep and wake states. Identifying novel compounds which alter the sleep-wake states may lead to new pharmacological approaches for treating a variety of sleep-wake disorders as well as for influencing human fatigue, alertness, performance, cognition, memory and learning as well as other aspects of human biochemistry, metabolism and/or behavior that are affected by the quantity and quality of the sleep-wake cycle.

Another aspect of this invention relates to identification of sleep genes and an understanding of their role in the regulation of sleep. One approach for finding new sleep genes is to screen animals showing sleep-wake abnormalities and determining whether there is a corresponding genetic basis. The general methodology of the present invention can be extended to such studies and can be expected to be especially useful when screening the offspring of mutagenized animals for sleep abnormalities, such screening typically involving the test and monitoring of thousands of animals.

Accordingly, the methods of this invention would permit the efficient and cost-effective screening of such genetic screening. Furthermore, those animals showing alterations in sleep as neonates can be maintained until adulthood when regular EEG sleep can be monitored to further analyze and characterize sleep. The approach afforded by the present invention will greatly enhance the ability to find abnormal sleep and wake phenotypes occurring naturally or as have been induced by mutagenesis. Identifying animals with altered sleep-wake phenotypes will allow for the identification, characterization and ultimate cloning of the mutated gene underlying the altered phenotype, through standard molecular genetic techniques. Identifying novel sleep genes or mutated genes which alter sleep-wake states can then lead to new pharmacological approaches for treating a variety of sleep-wake disorders.

DETAILED DESCRIPTIONS OF PREFERRED EMBODIMENTS

Methods relating to the present invention can be understood in the context of one or more selected embodiments and are further illustrated by several of the corresponding examples. For instance and without limitation, methods involving the use of neonatal rodent pups to identify sleep-wake states in adults, together with the various associated benefits and advantages, can be demonstrated through the longitudinal studies discussed below and as further illustrated in Examples 2–3, below.

While various characteristics of the sleep-wake cycle in mammals are clearly under genetic control, [O'Hara B. F. and Mignot E. (2000) Genetics of sleep and its disorders. In *Genetic Influences on Neural and Behavioral Functions* (eds. Pfaff D. W., Berretinni W. H., Joh T. H. and Maxson S. C.), pp. 307–325. CRC Press, Inc., Boca Raton, Fla.] at the present time the major regulatory genes involved in the control of the sleep-wake cycle are unknown. One powerful approach for discovering novel genes involved in the regulation of a particular phenotype requires screening thousands of animals for abnormal phenotype that are the offspring of mutagenized animals, and then determining whether there is a genetic basis to these abnormalities. This "forward genetics" approach for uncovering novel sleep genes is difficult, if not impossible, if the standard sleep recording method is utilized because of the labor intensive and expensive means for recording electroencephalographic sleep to differentiate the states of wake, rapid eye movement and non-rapid eye movement sleep in adult animals.

In accordance with this invention, the genetic differences in sleep architecture that are observed in adult animals of two strains of rats can be detected in the same animals at 8 days of age by monitoring behavioral states via only electromyographic recordings. This indicates that it would be possible to screen for genetic abnormalities (and ultimately new sleep genes) by monitoring behavioral sleep-wake states in the neonatal animal by rapid, simple and inexpensive methods, and that behavioral sleep states in the neonate are under similar genetic control as the rapid eye movement and non-rapid eye movement sleep states in adult animals.

While the emergence of behavioral sleep states is one of the most fundamental aspects of development in mammals, the relationship between these states in the neonatal and adult animal, if any, is not known. Early studies indicated that the behavioral sleep states in the neonate, active sleep (AS) and quiet sleep (QS), are immature forms or precursors to the electroencephalographic (EEG)-defined sleep states of rapid eye movement (REM) and non-REM (NREM) sleep, respectively, in adult animals. [Jouvet-Mounier D., Astic L. and Lacote D. (1970) Ontogenesis of the states of sleep in rat, cat, and guinea pig during the first postnatal month. *Dev. Psychobiol.* 2, 216–239.] In contrast, the results of more recent studies have been interpreted to indicate that AS is an undifferentiated behavioral state from which both REM and NREM sleep develop. [Frank M. G. and Heller H. C. (1997) Development of REM and slow wave sleep in the rat. *Am. J. Physiol.* (*Regulatory Integrative Comp. Physiol*) 272, R1792–R1799.] Clear genetic differences in the characteristics of the behavioral sleep states in adult animals of different strains of rodents [Franken P., Malafosse A. and Tafti, M. (1999) Genetic determinants of sleep regulation in inbred mice. *Sleep* 22, 155–169; Valatx J.-L., Bugat R. and Jouvet M. (1972) Genetic studies of sleep in mice. *Nature* 238, 226–227.] offer a potential window for examining, at least at the genetic level, how the neonatal and adult behavioral states are related to one another.

To determine whether the behavioral states of wake (W), AS and QS are under similar genetic control as the adult EEG sleep states of W, REM and NREM sleep, respectively, we took advantage of the recent finding that large differences exist in the EEG sleep between the inbred Wistar Kyoto (WKY) rat relative to its progenitor strain, the Wistar (WIS) rat. [Dugovic C., Solberg L. C., Redei E., Van Reeth 0. and Turek F. W. (2000) Sleep in the Wistar-Kyoto rat, a putative genetic animal model for depression. *NeuroReport* 11, 627–631.] The most pronounced differences between the strains were a 50% increase in total REM sleep time during the 12-h light phase, and a more fragmented sleep during both the light and dark phases in the WKY rats. Thus, the aim of the present study was to determine if differences in the behavioral states of vigilance in neonatal animals of the two strains would reflect the differences in EEG sleep observed later in the same animals when adults.

Figure 1:
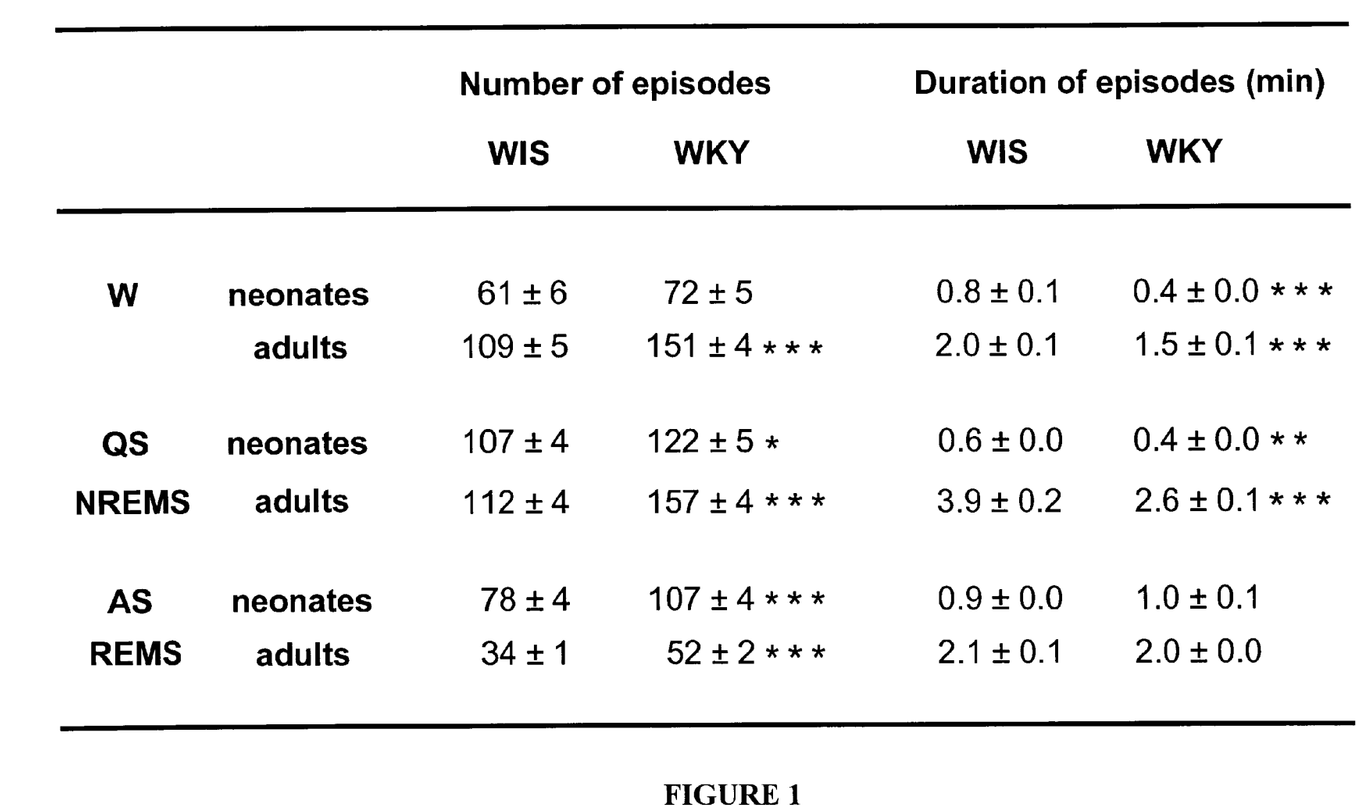
FIG. 1 shows in tabular form the number and duration of episodes for each vigilance state during 3 h in the light phase in neonates and during the 12-h light phase in adult Wistar (WIS) and Wistar Kyoto (WKY) rats. Values of wake (W), quiet sleep (QS) and active sleep (AS) in neonates at 8 days of age and of W, non-rapid eye movement sleep (NREMS) and rapid eye movement sleep (REMS) in the same animals as adults at 3months of age are means (±S.E.M.) of 8 animals in each group. * $p<0.05$;  $p<0.01$; * $p<0.001$ (unpaired two-tailed Student t-test) for between-groups comparisons.
Figure 2:
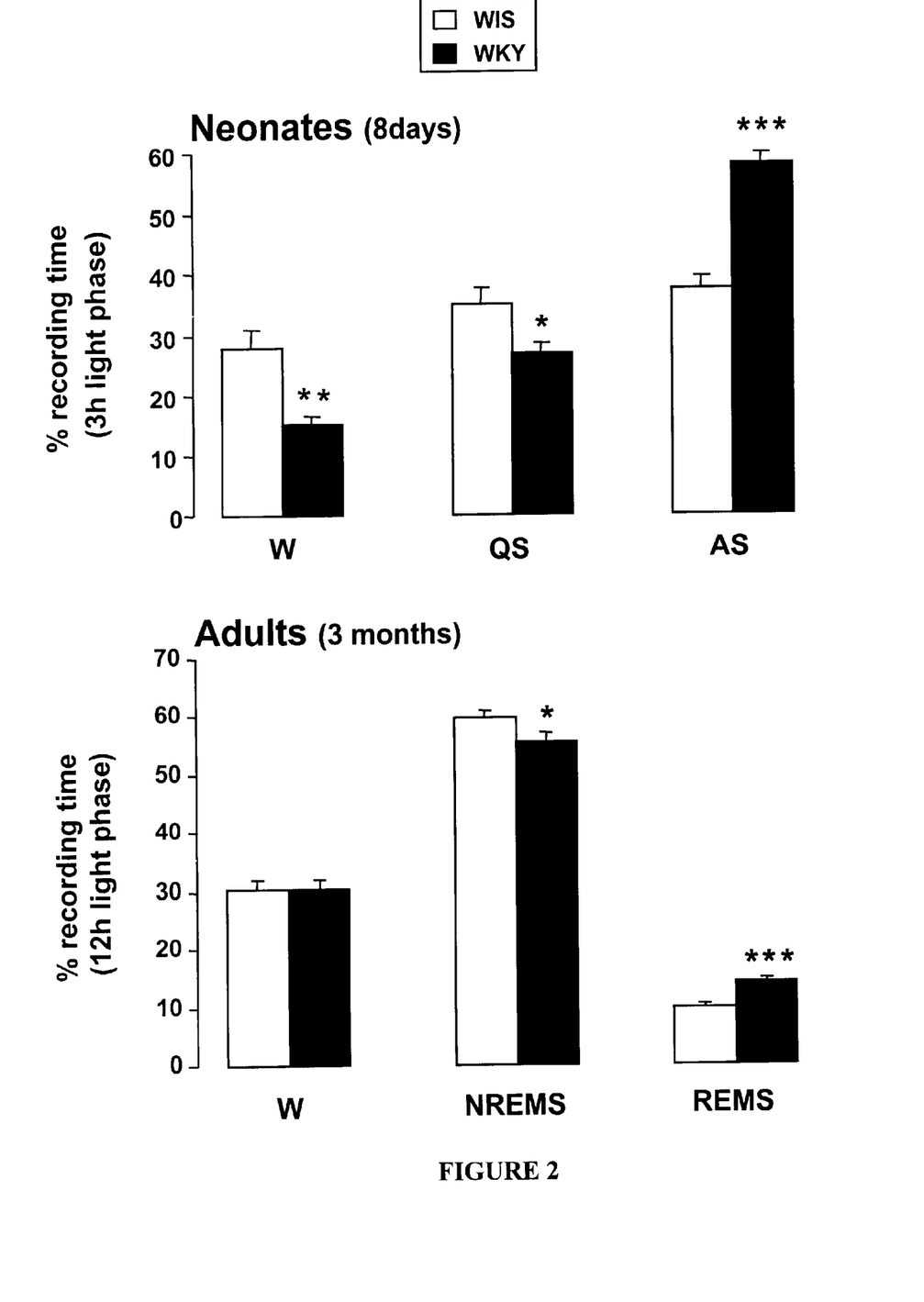
FIG. 2 compares the time spent in the different states of vigilance during 3h in the light phase in neonates at 8 days of age and in the same animals as adults at 3 months of age during the 12-h light phase in eight Wistar (WIS) and eight Wistar Kyoto (WKY) rats. Means (+S.E.M.) values of wake (W), quiet sleep (QS) and active sleep (AS) in neonates (top figure) and of W, non-rapid eye movement sleep (NREMS) and rapid eye movement sleep (REMS) in adults (bottom figure) are expressed as percentage of recording time. * $p<0.05$;  $p<0.01$; * $p<0.001$ (unpaired two-tailed Student t-test) for between-groups comparisons.

As provided in Examples 2–3, below, behavioral vigilance states were monitored via electromyographic (EMG) recordings in 8-day old neonatal animals for only a 3-h period during the light phase of a 12:12 h light-dark cycle, and at three months of age EEG sleep was recorded in the same animals over the entire 12-h light phase. Compared to WIS rats, WKY rats showed a marked increase in total AS time (+55%, $p<0.0001$) and in AS as a percentage of total sleep time (+32%, $p=0.0001$) at 8 days of age (FIG. 1). As adults, WKY rats exhibited a similar increase in total REM sleep time (+46%, p21 0.0001) and in REM sleep as a percentage of total sleep time (+46%, $p<0.0001$) during the 12-h light phase relative to the WIS rats. This effect was due to an increase in the number of AS and REM sleep episodes while their mean durations were similar in the two strains (FIG. 1). Conversely, WKY rats showed a decrease in time spent in QS as neonates when compared to WIS rats (FIG. 2). A decrease in NREM sleep (-8%, $p=0.0307$) was also observed in adult WKY rats relative to WIS rats. While the neonatal WKY rats spent significantly less time in W than the WIS rats, this difference was not present in adults. In addition, neonatal as well as adult WKY rats exhibited an increased sleep fragmentation relative to WIS rats, as indexed by a larger number of episodes in each vigilance state associated with a shorter duration of W and QS/NREMS episodes (FIG. 1). Thus, similar pronounced differences in the sleep-wake states were observed between WKY and WIS rats in adult and in neonatal animals.

While limited studies have been carried out to examine the relationship between sleep states in neonate and adult rodents, [Aalto J. and Hilakivi L. (1986) Differences in the sleep-wake patterns of the AA and ANA rat lines developed for high and low alcohol intake. *Alcohol* 3, 77–79; Daszuta A. and Gambarelli F. (1985) Early postnatal development of EEG and sleep-waking cycle in two inbred mouse strains. *Dev. Brain Res.* 22, 39–47.] this is the first longitudinal study (repeated measures in the same animals) demonstrating that genetic differences in sleep architecture that are observed in adult animals are already evident in neonatal animals. The present results indicate that AS and QS are under similar genetic control as the adult REM and NREM sleep states, respectively. Although EEG activity appears undifferentiated in the rat until about 12 days of age, [Gramsbergen A. (1976) The development of the EEG in the rat. *Dev. Psychobiol.* 9, 501–515; Jouvet-Mounier D., Astic L. and Lacote D. (1970) Ontogenesis of the states of sleep in rat, cat, and guinea pig during the first postnatal month. *Dev. Psychobiol.* 2, 216–239.] it appears that the behavioral states in an earlier neonatal period are at some fundamental level related to the more mature states of REM and NREM sleep in adults. While it is not known how neonatal AS and QS are physiologically related to adult REM and NREM sleep, respectively, the finding of many similar differences in sleep patterns in WIS and WKY rats in neonatal and adult life argues strongly that at some level they are controlled by similar cellular/physiological mechanisms.

A powerful approach for finding novel genes that are involved in the regulation of complex physiological and behavioral phenotypes is to screen the offspring of mutagenized animals to find animals with genetically transmitted abnormal phenotypes, and then to use mapping and positional cloning strategies to ultimately clone and characterize the function of the mutated gene. Because the mutation rate is relatively low (1 in 500–1,000 genes), [Takahashi J. S., Pinto L. H. and Hotz Vitaterna M. (1994) Forward and reverse genetic approaches to behavior in the mouse. *Science* 264, 1724–1733.] it is necessary to monitor the phenotype of interest in a large number of animals to have a high probability of obtaining a mutant animal with an abnormality in the phenotype of interest. This makes it impractical to use such an approach for uncovering novel sleep genes due to the labor intensive and expensive aspects of standard EEG sleep recording in adult animals. The present results offer a "proof of principle" that it would be possible to screen for genetic sleep abnormalities by simply recording the behavioral vigilance states in neonatal animals. Such measurements can be made easily by monitoring movement via the EMG and/or other movement detection procedures. The finding that adult differences in sleep architecture can be detected from as few as three hours of EMG recording in the neonate is an additional advantage in the use of this model as a highly cost effective and efficient way to screen for unknown genes involved in the regulation of the sleep-wake cycle.

From another perspective, the present methodologies can also be used in conjunction with animal models for the study of altered behavioral conditions that manifest themselves through sleep-wake states. For instance, various sleep disorders can exhibit abnormal sleep architecture.

Depressive patients often exhibit disturbances in metabolic and endocrine circadian rhythms as well as the sleep-wake cycle. [Van Cauter E and Turek FW. *Perspect Biol Med* 29, 510–519 (1986). Rossenwasser AM and Wirz-Justice A. Circadian rhythms and depression: clinical and experimental models. In: Redfern PH and Lemmer B, eds. *Handbook of Experimental Pharmacology*, vol 125. Berlin: Springer; 1997: 457–486.] Alterations in the sleep-wake cycle of depressed patients are often characterized by a shortened latency to the first rapid eye movement (REM) sleep episode, an increase in REM sleep amount and frequency during the first part of the night, and increased sleep fragmentation. [Kupfer D J and Reynolds C F. Sleep and affective disorders. In: Paykel E S, ed. *Handbook of Affective Disorders*, vol 1. Edinburgh: Churchill Livingstone; 1992: 311–323.] It remains to be determined whether depression is a cause or consequence of altered circadian rhythmicity and/or sleep, or whether a common cellular, neurochemical or hormonal defect underlies these abnormal behavioral states.

In order to elucidate the underlying biological mechanisms that lead to depression, a number of animal models for depression have been developed in both rodents and non-human primates. [Willner P. *Trends Pharmacol Sci* 12, 131–136 (1991).] In view of the extensive literature on the neural regulatory mechanisms underlying sleep and circadian rhythmicity in rodents, these animals are particularly attractive models for determining the interrelationships between depression and circadian rhythm and sleep abnormalities. Of particular interest is the development of genetic animal models for depression which also show altered circadian rhythm and sleep patterns that are similar to those observed in depressed patients. Alterations in circadian rhythmicity have been observed in two inbred strains of rats with depressive-like behavior: the Flinders Sensitive Line (FSL) [Shiromani P J and Overstreet D. *Biol Psychiatry* 36, 622–626 (1994).] and the Wistar Kyoto (WKY) rat. [Rossenwasser AM and Wirz-Justice A. Circadian rhythms and depression: clinical and experimental models. In: Redfern P H and Lemmer B, eds. *Handbook of Experimental Pharmacology*, vol 125. Berlin: Springer; 1997: 457–486.] While alterations in the sleep-wake cycle have been found in the FSL rats [Shiromani P J, Overstreet D, Levy D et al. *Neuropsychopharmacology* 1, 127–133 (1988).] that are somewhat-similar to those observed in depressed patients, very little is known about the 24-h patterns of EEG sleep in the WKY rat. [Carley D W, Trbovic S and Radulovacki M. *Physiol Behav* 59, 827–831 (1996).]

Although the WKY rat was originally bred as a normotensive control strain for the spontaneous hypertensive rat [Louis W J and Howes L G. *J Cardiovasc Pharmacol* 16 (suppl 7), S 1–5 (1990)], subsequent analysis of the behavior of this strain revealed a number of behavioral alterations associated with depressive-like behavior in humans. WKY rats are both hyper-responsive to stress and exhibit depressive and anxiety-like behaviors in numerous behavioral tests relative to various other rat strains including the Wistar (WIS) control strain. [Pare WI) and Redei E. *J Physiol Paris* 87, 229–238 (1993).] In addition, WKY rats exhibit several hormonal alterations associated with depression including a hyper-responsiveness of the HPA axis to stress [Pare WP) and Redei E. *J Physiol Paris* 87, 229–238 (1993); Redei E, Pare WP, Aird F et al. *Am J Physiol* 266, R353–360 (1994); Gomez F, Lahmame A, de Kloet E R et al. *Neccroendocrinology* 63, 327–337 (1996).] Importantly, changes were demonstrated in endocrine rhythms in WKY rats relative to WIS rats that parallel to some extent abnormalities often associated with human depression. [Solberg L C, Turek F W, Losee-Olson S et al. *Soc Neurosc Abst* 24, 1376 (1998).] Compared to other strains, differences in various parameters of the circadian rhythm of locomotor activity have also been observed in WKY rats [Rossenwasser AM and Wirz-Justice A. Circadian rhythms and depression: clinical and experimental models. In: Redfern P H and Lemmer B, eds. *Handbook of Experimental Pharmacology*, vol 125. Berlin: Springer; 1997: 457–486.]

If the WKY rat is indeed an animal model for sleep disorder and/or depression, it should also exhibit abnormalities in sleep architecture that show similarities to those observed in such states. Examples 4–9 illustrate various aspects of this methodology and show how the WKY rat and the WIS control strain differ in their 24-h EEG sleep-wake patterns under baseline conditions and during recovery after a 6-h sleep deprivation period.

Figure 4:
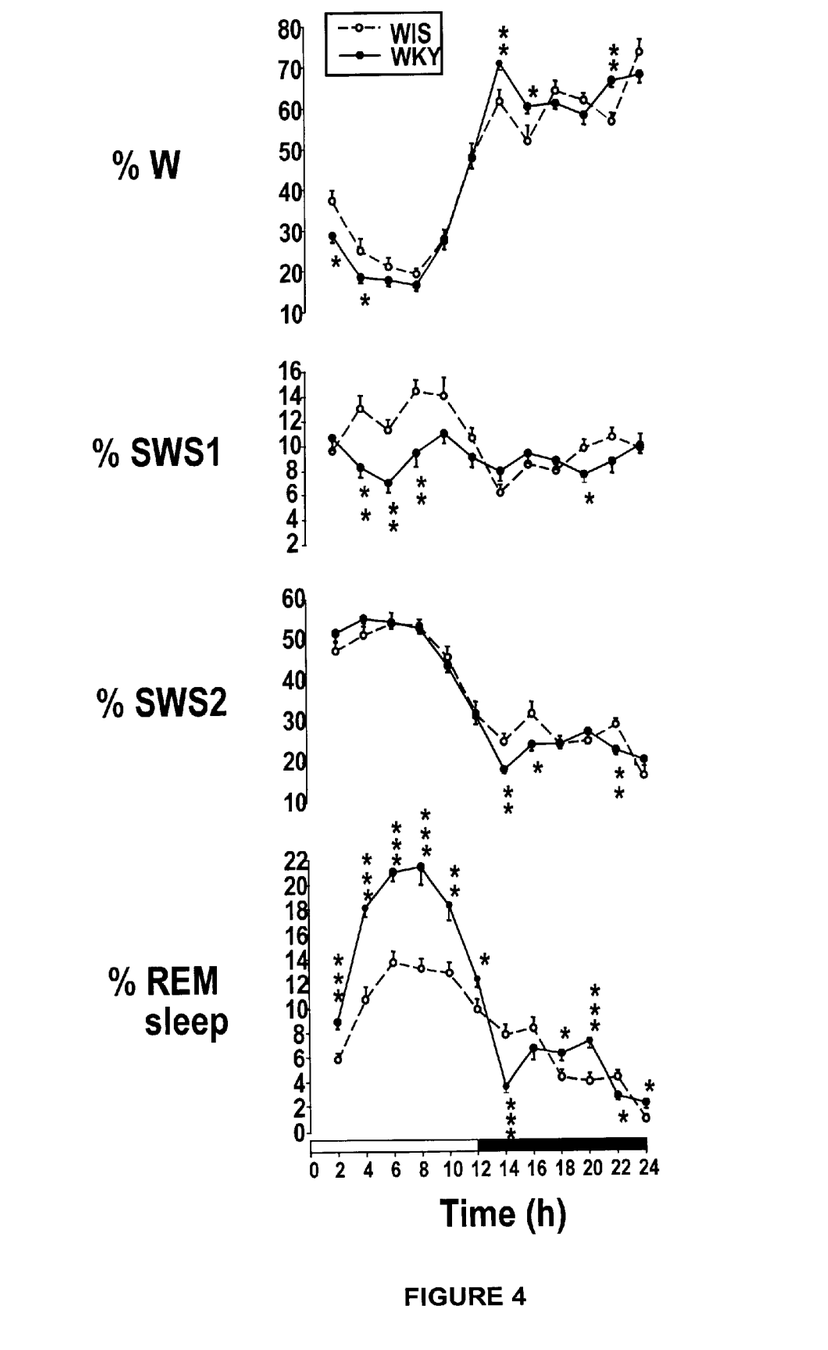
FIG. 4 shows distribution per 2-h intervals of vigilance states in twelve Wistar (WIS) and twelve Wistar Kyoto (WKY) rats under baseline conditions. Mean (±SEM) values of wake (W), light slow wave sleep (SWS1), deep slow wave sleep (SWS2) and rapid eye movement (REM) sleep are expressed as percentage of recording time. *p<0.05; p<0.01; *p<0.001 (unpaired two-tailed Student t-test) for between-groups comparisons.
Figure 5:
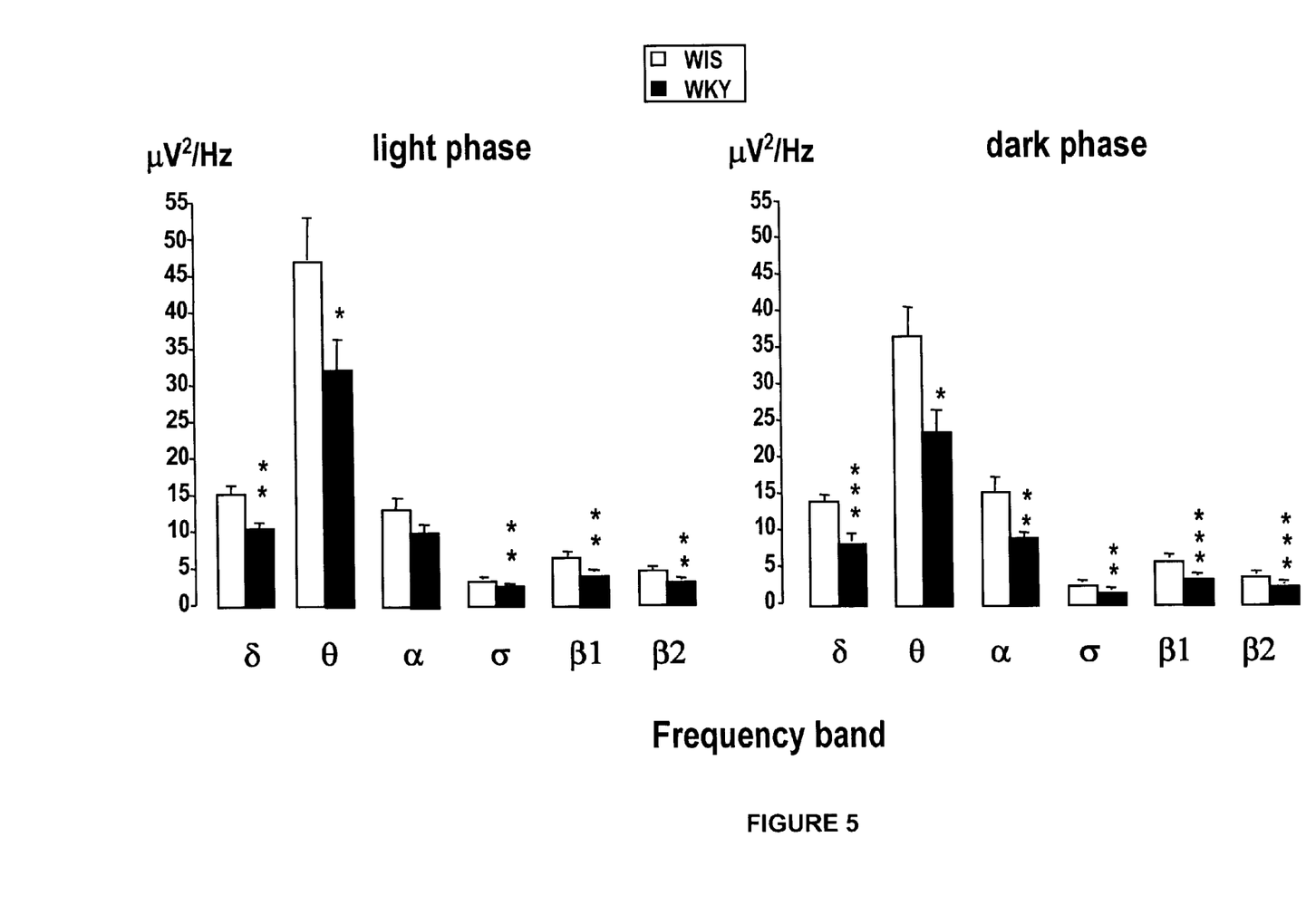
FIG. 5 shows EEG power spectral activity within REM sleep during the light phase (left panel) and dark phase (right panel) in WIS and WKY rats. Mean values ($\mu V^2$/Hz±SEM) of EEG power densities are calculated in the following frequency bands: delta ($\delta$: 0.2–4.0 Hz), theta ($\theta$: 4.2–7.8 Hz), alpha ($\alpha$: 8.0–12.0 Hz), sigma ($\sigma$:12.2–13.8 Hz), beta-1 ($\beta$1: 14.0–18.0) and beta-2 ($\alpha$2: 18.2–25.0 Hz). *p<0.05; p<0.01; *p<0.001 (unpaired two-tailed Student t-test) for between-groups comparisons.

A number of differences in the sleep-wake architecture were found between the WKY rat and the WIS control strain. In particular, there was a clear increase in the amount of REM sleep as well as in sleep fragmentation in WKY rats relative to WIS rats. The 50% increase in REM sleep for the entire 12-h light phase was particularly striking. Indeed, throughout much of the light phase WKY rats showed nearly a 100% increase in REM sleep (FIG. 4). This increase in REM sleep duration during the light phase was associated with a 30–40% decrease in the total power density, not only in the dominant theta frequency band but also within all the other frequency bands (FIG. 5). While it could be hypothesized that the decreased power density is due to the elevated REM sleep duration during the light phase, the finding that a similar decreased power occurs during the dark phase, without an associated increase in REM sleep duration, indicates that other factors must underlie the differences in REM sleep power density between the two strains.

Figure 7:
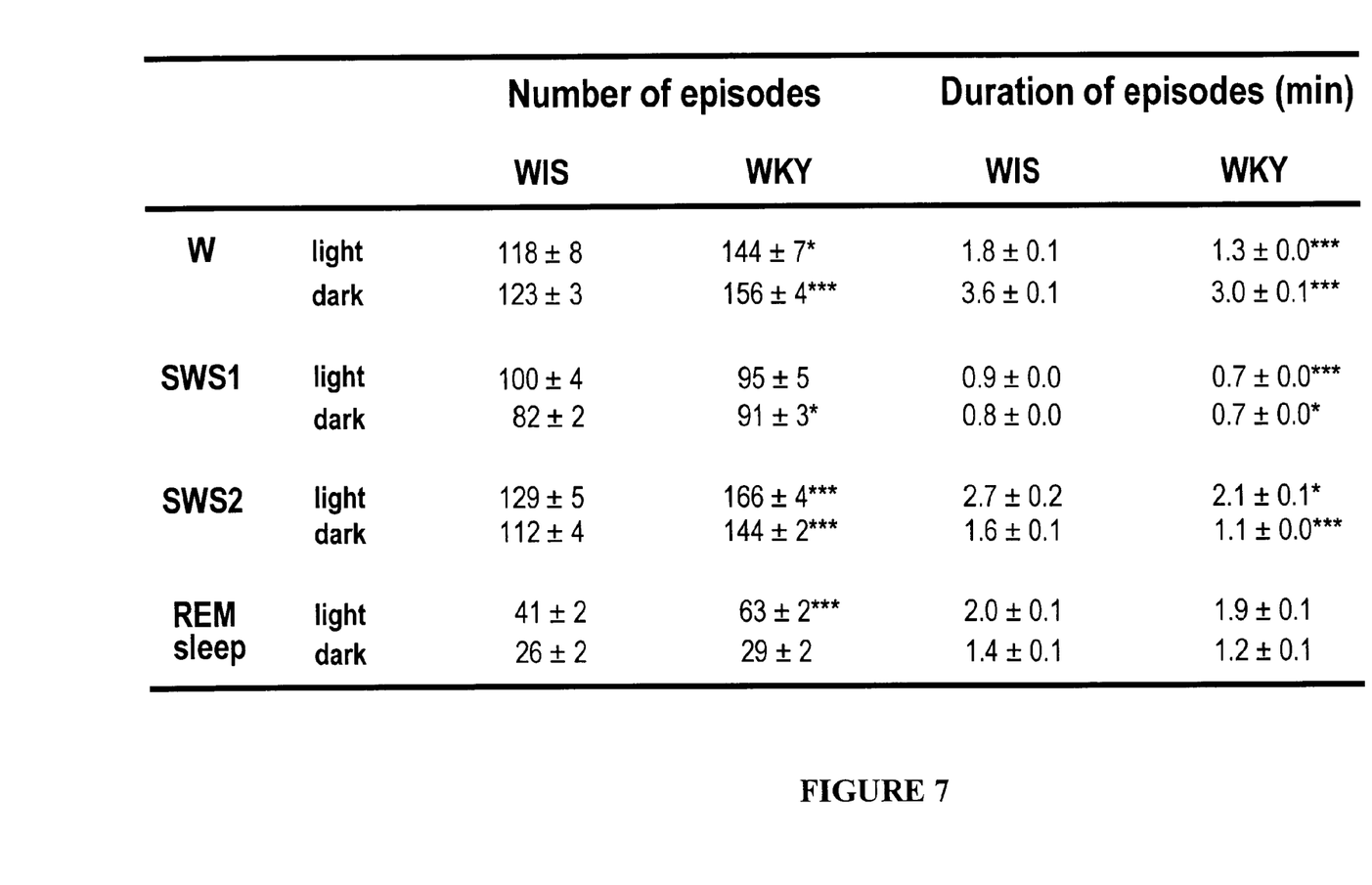
FIG. 7 shows the number and duration of episodes for each vigilance state during the light (0–12 h) and dark phase (12–24 h) in Wistar (WIS) and Wistar Kyoto (WKY) rats under baseline conditions. Values are means (±SEM) of 12 animals in each group.

An increased sleep fragmentation in the WKY rat was particularly evidenced by both an increase in the number of wake and SWS2 episodes, and a decrease in their mean duration, throughout the 24 h light-dark cycle when compared to the WIS rats. In contrast, the number of REM sleep episodes was increased only during the light phase without an associated decrease in their duration (FIG. 7). Taken together, these results demonstrate that the WKY rats are shifting rapidly from one vigilance state to another, indicating they have a less stable sleep-wake pattern than the WIS control rats, which parallels the poor sleep maintenance often observed in depressed patients. [Kupfer D J and Reynolds C F. Sleep and affective disorders. In: Paykel E S, ed. *Handbook of Affective Disorders*, vol 1. Edinburgh: Churchill Livingstone; 1992: 311–323.]

An increase in REM sleep has also been reported in a second genetic rat model of depression, the FSL rat. [Shiromani P J, Overstreet D, Levy D et al. *Neuropsychopharmacology* 1, 127–133 (1988).] However, while there was an increase in REM sleep when expressed as a percentage of total sleep time, there was no significant increase in the total REM sleep time in FSL rats. Prenatally stressed rats, which show depressive-like behavior as adults, also have increased amounts of REM sleep as well as increased sleep fragmentation. [Dugovic C, Maccari S, Weibel L et al. *J Neurosc* 19, 8656–8664 (1999).] Although transitory, an increase in REM sleep and depressive-like behavior is also observed following chronic mild stress in rats. [Cheeta S, Ruigt G, van Proosdij J. et al. *Biol Psychiatry* 41, 419–427 (1997).] Taken together with the present findings, these data indicate that an increase in REM sleep is strongly associated with depressive-like behavior in rodents whether the behavior is induced by environmental or genetic factors.

Figure 6:
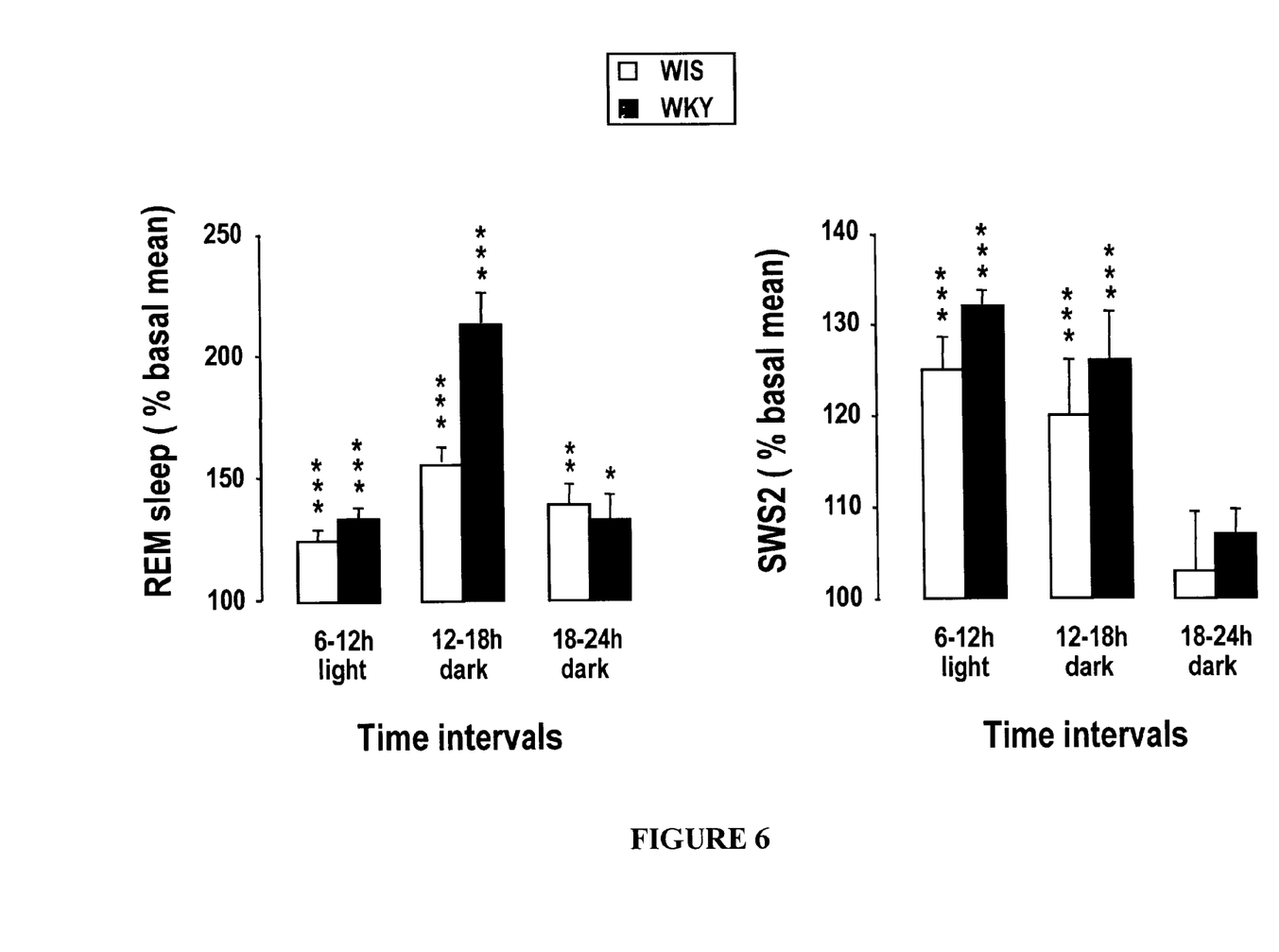
FIG. 6 shows effects of 6-h sleep deprivation starting at light onset on the amounts of REM sleep (left panel) and SWS2 (right panel) during three consecutive 6-h intervals of sleep recovery in twelve WIS and twelve WKY rats. Mean (±SEM) values of REM sleep and SWS2 are presented as a percentage of their corresponding baseline mean values. Both groups showed a significant increase in the amounts of REM sleep over the entire 18 h of analysis and of SWS2 for the two first 6-h intervals after sleep deprivation (*p<0.05; p<0.01; *p<0.001; paired two-tailed Student t-test).

Following a 6-h period of sleep deprivation, both WIS and WKY rats showed an increase in both REM sleep and SWS2 duration as well as in SWA during SWS2 (FIG. 6). These results are consistent with those previously found using the same experimental paradigm in Sprague-Dawley rats. [Tobler I and Borbély A A. *Behav Brain Res*, 36, 73–78 (1990).] However, the magnitude of the REM sleep rebound was more pronounced in WKY rats than in WIS rats, with this difference being restricted to the first half of the dark phase (FIG. 6, left panel). In strains of mice showing different levels of baseline REM sleep duration, higher baseline levels of REM sleep are associated with higher levels of REM sleep recovery following a 6-h period of sleep deprivation. [Franken P, Malafosse A and Tafti M. Sleep 22, 155–169 (1999).] Our results in WKY rats support the above observations in mice, indicating that animals with high baseline levels of REM sleep need more recovery REM sleep following sleep deprivation. While it is not clear if the duration of sleep recovery after sleep deprivation is altered in depressed patients, SWA after sleep deprivation has been reported to be similar in depressed and healthy subjects [Beersma D G M and van den Hoofdakker R H. *J Affect Disorders* 24, 101–108 (1992)], in accordance with our finding of no differences in SWA during sleep recovery in WKY and WIS rats.

At the present time the underlying neurophysiological mechanisms that could account for the differences in REM sleep between WKY and WIS rats are not known. Both the noradrenergic and serotonergic systems are thought to play a permissive role in REM sleep regulation. [Sakai K Central mechanisms of paradoxical sleep. In: Borbély A A and Valatx J L, eds. *Sleep Mechanisms, Exp Brain Res*, vol 8. Berlin: Springer; 1984: 3–18.] Lower norepinephrine levels in the locus coeruleus, and lower serotonin levels in the raphe nuclei associated with an increased serotonin synthesis have been reported in WKY rats as compared to WIS rats. [Felten S Y, Weyhenmeyer J A and Felten D L. *Brain Res Bull* 13, 437–441 (1984); Chaouloff F, Aguerre S and Mormede P. *Neuropharmacology* 37, 1159–1167 (1998).] It remains to be elucidated whether these monoamine differences could account for the increased REM sleep observed in WKY rats. Interpretation of other reports on monoamine changes in WKY rats is complicated by the fact that comparisons were being made against strains with widely differing genetic backgrounds. [Tejani-Butt S M, Pare W P and Yang J. *Brain Res* 649, 27–35 (1994); Conti L H, Youngblood K L, Printz M P et al. *Brain Res* 774, 27–34 (1997).] In view of the important role played by the cholinergic system in the executive mechanism of REM sleep [Hobson J A, Lydic R and Baghdoyan H A. *Behav Brain Sci* 9, 371–448 (1986)], it is tempting to speculate that cholinergic dissimilarities may also be involved in the differences in REM sleep between the WKY and WIS strains. Indeed, FSL rats demonstrate an upregulated central cholinergic system. [Overstreet D H, Russel R W, Crocker A D et al. *Experientia* 44, 465–472 (1988).] However, there are no reports comparing central cholinergic activity between the WKY and WIS strains of rats.

This study demonstrated that under baseline conditions, the WKY rat showed certain sleep characteristics that are often found in depressive patients, an increase in total REM sleep time during the light phase and an elevated sleep fragmentation over the entire light-dark cycle relative to the control strain, the WIS rat. Since the WKY rat represents a genetic model for depression, and now for sleep abnormalities, it may be possible to use this strain to identify candidate genes that underlie depression and/or are involved in the regulation of sleep. The finding that this animal also shows disruption of normal behavioral and endocrine circadian rhythms makes it, in conjunction with the present invention, a potentially useful model for investigating the casual relationships between the genetic differences in depressive behavior, sleep and circadian phenotypes found in this strain and potentially others.

EXAMPLES OF THE INVENTION

The following non-limiting examples and data illustrate various aspects and features relating to the methods and/or applications of the present invention. In comparison with the prior art, the present methodology provides results and data which are surprising, unexpected and contrary to the prior art. While the utility of this invention is illustrated through the use of several methods, animal populations and various sleep-wake states which can be associated therewith, it will be understood by those skilled in the art that comparable results are obtainable with various other methodologies commensurate with the scope of this invention.

The methods described herein can be utilized through various techniques as would be known to those skilled in the art and made aware of this invention. Generally, the procedures provided in Example 1, below, are preferred and can be used with good effect. Subsequent examples provide protocols particularly useful with various embodiments of the broader aspects of this general methodology.

Example 1

To record neonatal vigilance states, the pups are separated from their mother for 3 hours, a time-period short enough not to cause any major decrease in the amount of AS (Hofer, 1976). Just before the sleep recording the pups are removed from the home nest (2–3 pups per litter). The pups are placed in an acrylic chamber containing home cage bedding material placed on an electrical incubator adjusted at a temperature of 32° C. Two muscular electrodes are temporally placed only for the duration of the recording. Teflon coated multistrand wires (from Medwire, Mount Vernon, N.Y.) composed of 10% iridium and 90% platinum (coated diameter 0.007 inches and bare diameter 0.005 inches) are used as electrodes. The combination of the chemically neutral platinum with iridium is combined with Teflon insulation. The wires are rapidly inserted across the nuchal muscle using a 21G hypodermic needle as a guide. The internal part of the wire of about 5 mm length is uninsulated to allow the electrical conductance of the EMG signal. One external part of the wire is bent over the skin to maintain the electrode and the other external part is connected with a cable to a rotating swivel allowing free movements during the recording session. At the end of the recording session the electrodes are quickly removed from the nuchal musculature by unbending the external part. Then the pup is returned to the home nest.

Each recording session lasts three hours. The EMG activity is monitored on a polygraph (Nihon-Kohden) with an output connected to a computer for on-line analysis of the EMG signal. The recordings obtained by this technique allow for the determination of the different vigilance states of the rat or mouse pup. Simultaneous behavioral observations have confirmed the accuracy of the EMG in reflecting movements.

Figure 3A:
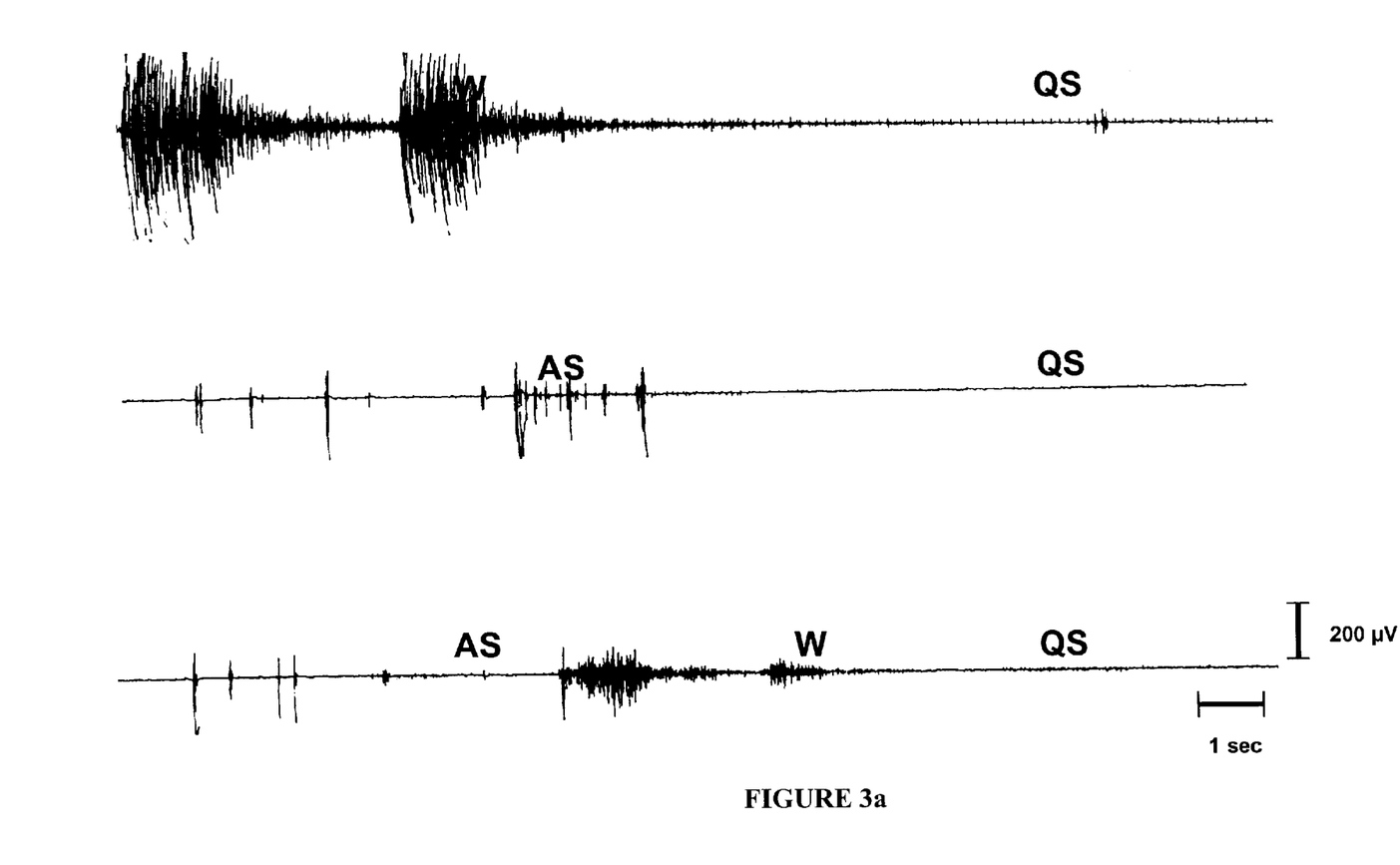
FIG. 3a shows electromyographic recordings of the neck muscles from 8-day old rat pups illustrating the characteristics of the different vigilance states, wake (W), quiet sleep (QS) and active sleep (AS).
Figure 3B:
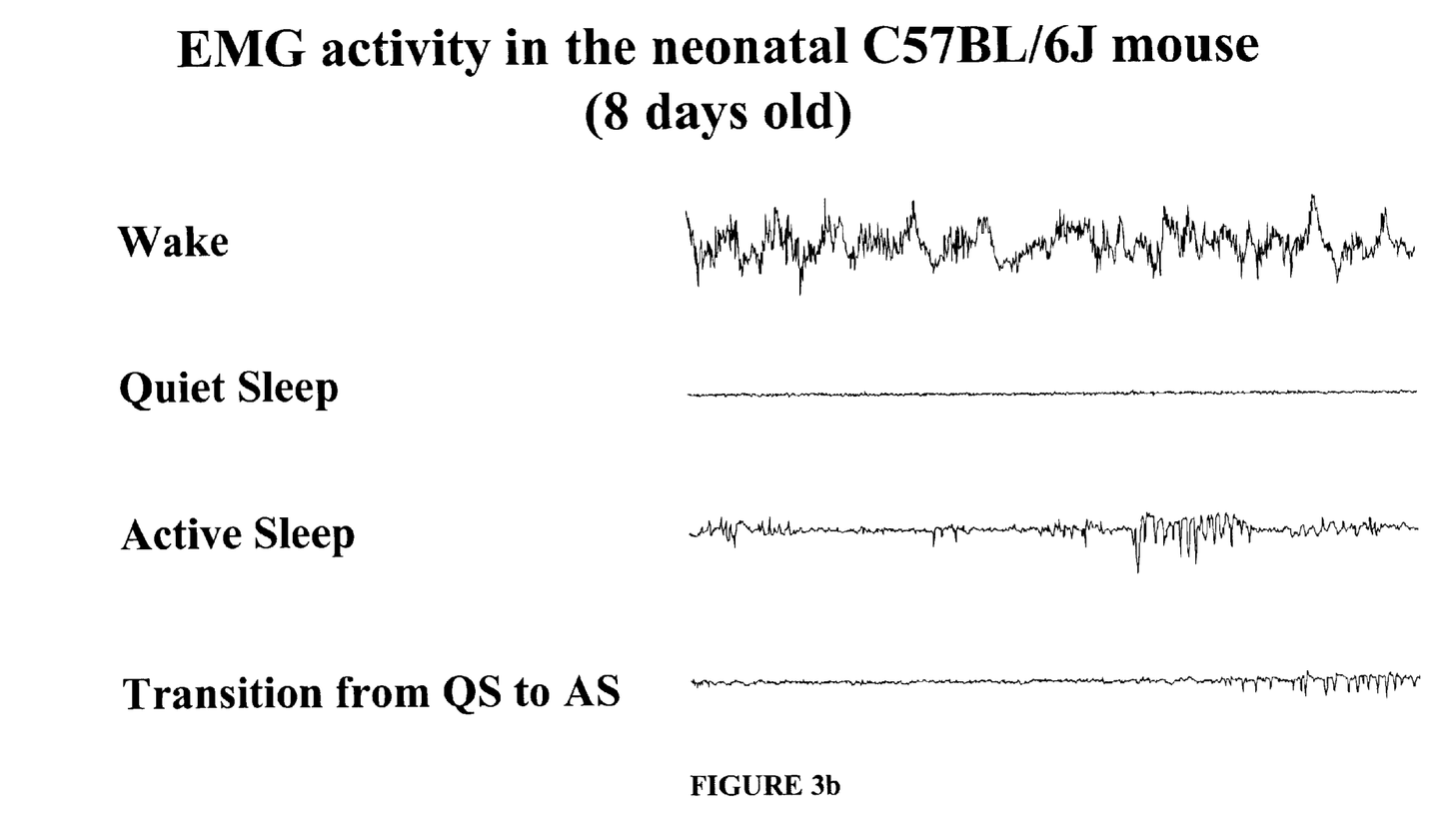
FIG. 3b shows electromyographic (EMG) recordings of the neck muscles from 8-day old mouse pups illustrating the characteristics of the different vigilance states, wake (W), quiet sleep (QS) and active sleep (AS).

The EMG recordings are analyzed by using average EMG amplitude and movement deflections as scoring criteria. Polygraphic recordings are visually scored by 15 sec epochs and classified as being wake (W), quiet sleep (QS) or active sleep (AS) according to the following criteria: W is defined on the basis of elevated muscle tonus with the rat moving actively. QS is characterized by a very low EMG activity without body movements and muscular twitches. In QS the animals remain mostly still, but startles as well as changes in body posture occur intermittently. AS is classified on the basis of a flat muscle tonus with numerous muscular twitches (a minimum of 3 twitches per 15 sec epoch). FIG. 3a shows polygraphic recordings of the EMG from a 8-day old rat pup, and FIG. 3b from an 8-day old mouse pup. In these recordings the characteristics of the different sleep-wake states (W, QS and AS) are illustrated.

Example 2

Pregnant female WKY and control WIS rats (n=3 of each strain, from Harlan Netherland) were maintained under standard environmental conditions (12:12 h light-dark cycle, 22±2° C. ambient temperature, food and water available ad libitum). At birth, pups remained with their litter and at 8 days of age 2–3 male pups from each litter were selected for the study. To record neonatal vigilance states, pups were removed from the home nest and placed in a recording chamber containing home cage bedding material. During maternal separation body temperature was maintained by an electrical incubator adjusted to a temperature of 32° C. The behavioral states of vigilance were differentiated by recording EMG activity with electrodes temporary fixed in the nuchal musculature only for the duration of the recording. Although EEG activity appears undifferentiated in the early postnatal period, the precursor forms of behavioral sleep states, AS and QS, can be accurately differentiated in the neonate on the basis of EMG activity because of the unique presence of abundant muscular twitches during AS in the first 10 days of life. A relatively short recording period (3h during the first half of the light phase) was selected to minimize the detrimental effects of maternal separation. Furthermore, it is not necessary to take into account any possible diurnal variation in the vigilance states in the neonates since diurnal rhythmicity in the sleep-wake cycle is not present until the third postnatal week of life. Two months later, when adults, the rats were chronically implanted under deep anesthesia (subcutaneous injection of 1 ml Thalamonal) with EEG and EMG electrodes for standard sleep monitoring. After recovery from surgery (10 days) and a two-week adaptation period to the recording conditions, a 12h recording session beginning at the onset of the light phase was performed in all rats.

Example 3

Polygraphic recordings in neonates were visually scored by 15 sec epochs and classified as being wake (W), quiet sleep (QS) or active sleep (AS). FIG. 3a illustrates the characteristics of the different vigilance states based on EMG recordings from 8-day old rat pups where W is identified by high amplitude EMG activity, QS by very level of EMG activity and AS by absence of muscular tone punctuated with frequent muscular twitches. In adults, polygraphic recordings were classified as either wake (W), non-rapid eye movement (NREM) sleep or rapid eye movement (REM) sleep according to standard criteria (W, low-voltage fast EEG activity and high EMG activity; NREM sleep, high-amplitude slow cortical waves and low EMG activity; REM sleep, low-voltage fast cortical waves with a regular theta rhythm and absence of muscular tone). ANOVA was used to measure statistical differences in the sleep-wake parameters between WIS and WKY rats, as neonates and as adults. Subsequently, the unpaired two-tailed Student t-test was used for between-groups comparisons.

Example 4

Twelve Wistar Kyoto (WKY) and twelve control Wistar (WIS) rats (from Harlan Netherland), all adult males weighing 260–280 g and maintained under standard environmental conditions (12:12 h light-dark cycle, 22±2° C. ambient temperature, food and water available ad libitum) were used in the present study. Under deep anesthesia (subcutaneous injection of 1 ml Thalamonal®), the rats were implanted with chronic electrodes for polygraphic recording of fronto-parietal electroencephalogram (EEG), electro-oculogram (EOG) and nuchal electromyogram (EMG). Ten days after surgery, the animals were habituated to the recording procedure for two weeks. The animals were connected at regular intervals with a cable to a rotating swivel and EEG, EOG and EMG activities were monitored for 8 to 24 hours. Following this adaptation period, a 24-h recording session beginning at the onset of the light phase was performed in all rats. One week later, sleep deprivation was performed by gentle handling [Tobler I and Borbély AA. Behav Brain Res, 36, 73–78 (1990).] during the first 6 hours of the light phase and EEG sleep was recorded for the following 18 hours. An 18-h recording session obtained the preceding day served as a baseline to assess the effects of sleep deprivation.

Example 5

Polygraphic recordings were visually scored by 30-sec epochs as either wake (W), light slow wave sleep (SWS1), deep slow wave sleep (SWS2) or rapid eye movement (REM) sleep, according to standard criteria. [Dugovic C, Maccari S, Weibel L et al. J Neurosc 19, 8656–8664 (1999)] The EEG signal was high-pass frequency filtered at 1 Hz and low-pass frequency filtered at 35 Hz and processed for power spectral analysis. Every 15 sec, Fast Fourier transformations were performed within a frequency range of 0.2–25.0 Hz with a frequency resolution of 0.2 Hz. Values for power spectra were divided into six frequency bands: delta ($\delta$: 0.2–4.0 Hz), theta ($\theta$: 4.2–7.8 Hz), alpha ($\alpha$: 8.0–12.0 Hz), sigma ($\sigma$: 12.2–13.8 Hz), beta-1 ($\beta1$: 14.0–18.0) and beta-2 ($\beta2$: 18.2–25:0 Hz). Sleep-wake parameters and EEG power spectra were compared between WIS and WKY rats under baseline conditions. Sleep data were analyzed with factorial ANOVA at different times across the entire recording period. Subsequently, the unpaired two-tailed Student t-test was used for between-groups comparisons. Within each group, differences between baseline and recovery from sleep deprivation were assessed by means of the paired two-tailed Student t-test for the sleep-wake parameters and by the Wilcoxon signed-rank test for the EEG power spectral values.

Example 6

Under baseline conditions, marked differences in the sleep-wake cycle were observed between the two strains. These differences were more pronounced during the light phase than the dark phase, as illustrated by the distribution of vigilance states in 2-h intervals over the 24-h light-dark cycle (FIG. 4). During the 12-h light phase, WKY rats showed a 51% (p<0.0001) increase in total REM sleep time as compared to WIS rats. This effect was due to a significant increase in the number of REM sleep episodes, while their mean duration was similar in the two strains (FIG. 7). In addition to differences in REM sleep, a decrease in total SWS 1 time (−24%, p=0.002) and in wake (W) time (−12%, p=0.04) was observed in the WKY rats, whereas no difference was found in the total SWS2 time. During the 12-h dark phase, the total time spent in W, SWS1, SWS2 and REM sleep did not differ between the two strains. However, when the vigilance states were analyzed in 2-h intervals a number of significant dissimilarities were revealed in their nocturnal distribution (FIG. 4). In addition, WKY rats exhibited an increased sleep fragmentation during both the light and dark phase, as indexed by a larger number of episodes in each vigilance state and a shorter duration of W, SWS1 and SWS2 episodes (FIG. 7).

Example 7

Quantitative analysis of the EEG activity in specific states of vigilance also revealed substantial differences in the baseline power spectral values during REM sleep between the strains. The power densities were significantly reduced by about 30 to 40% in WKY rats as compared to WIS rats in all the frequency bands studied during both the light and dark phase (FIG. 5). In contrast, only minor but significant differences in power spectral values (i.e., lower alpha and beta-2 activity in WKY rats) were found during SWS2 across the entire light-dark cycle. In addition, the time course of the slow wave activity (SWA), i.e., EEG power in the delta frequency band, over consecutive 2-h intervals was comparable in the two strains (data not shown).

Example 8

During the 18-h baseline recording period preceding sleep deprivation, the same differences in the sleep-wake patterns were observed between the two strains when compared to those obtained one week earlier during the first baseline 24-h recording session. In particular, WKY rats spent more time in REM sleep (+36%, p=0.0001) and less time in SWS1 (−40%, p<0.000 1) during the last 6 hours of the light phase and exhibited an increased sleep fragmentation over the 18-h recording period as compared to WIS rats. Similarly, EEG power spectral values during REM sleep differed between the two strains as found in the first baseline recording session (not shown).

Example 9

After 6-h of sleep deprivation starting at the onset of the light phase, both groups of rats showed a significant rebound increase in REM sleep during the three consecutive 6-h intervals of sleep recovery (FIG. 6, left). However, the relative REM sleep increase, expressed as percentage of individual baseline values, was significantly higher in WKY than in WIS rats (+125% versus +60%, p=0.0024) during the first 6-hr period of the dark phase. In both groups of rats, a rebound increase in SWS2 was present mainly during the remaining 6-hr period of the light phase and the first 6-h period of the dark phase (FIG. 6, right). In contrast to REM sleep, the percentage increase in SWS2 was comparable in the two strains. SWS2 intensity, as indexed by EEG slow wave activity (SWA), was also affected by the sleep deprivation. Indeed, EEG power density in the delta frequency range (0.2–4.0 Hz) was significantly increased above baseline values during the first three 2-h intervals following deprivation, with a comparable magnitude in the two strains (data not shown). In both groups, EEG power spectral activities during REM sleep were not altered by the 6-h sleep deprivation.

Applications

Many pharmaceutical and biotechnology companies, as well as research institutes and universities are looking for new sleep genes, and some are planning to take a mutagenesis and phenotypic screening approach to find novel genes. These genes and their protein products will represent new targets for drug discovery of agents which can affect the sleep-wake states of mammals. Through use of the present invention, identifying sleep phenotype abnormalities, and thus novel sleep genes, or known genes which when mutated alter the sleep-wake states (not possible to find the gene without the phenotype) may lead to new pharmacological approaches for treating a variety of sleep-wake disorders and for influencing human fatigue, alertness, performance and cognition, memory and learning as well as other aspects of human biochemistry, metabolism and/or behavior that are affected by the quantity and quality of the sleep-wake cycle.

While the principles of this invention have been described in connection with specific embodiments, it should be understood that these descriptions are made only by way of example and are not intended to limit the scope of the invention, in any manner. For example, various other techniques and apparatus can be used to record electromuscular activities, such techniques and apparatus as could be modified or otherwise adapted by those skilled in the art for use in conjunction with the present invention. Such modified apparatus and/or techniques could include without limitation static charge sensitive mattresses that measure total body and respiratory movements, such techniques/apparatus as could be used alone or in combination with one or more other electrographic approaches of the type described herein. Other advantages and features of the present invention will become apparent from the claims hereinafter, with the scope thereof as determined by their reasonable equivalents and as would be understood by those skilled in the art.

What is claimed:

1. A method of using a neonatal rodent pup to identify sleep-wake states in an adult rodent animal, said method comprising:
   providing at least one neonatal rodent pup and recording electromuscular activities in said rodent pup;
   assigning a sleep-wake state to each said electromuscular activity; and
   identifying an adult rodent animal having said assigned sleep-wake state, said adult rodent animal matured from said neonatal rodent pup assigned said sleep-wake state.

2. The method of claim 1 wherein said sleep-wake states are assigned comparing neonatal and adult populations of test rodents with, respectively, neonatal and adult populations of control rodents.

3. The method of claim 1 wherein said electromuscular activity is recorded by electromyography.

4. The method of claim 1 wherein said assigned sleep-wake states are selected from the group consisting of active sleep, quiet sleep and wake.

5. The method of claim 4 wherein said assigned sleep-wake states further include sleep fragmentation.

6. The method of claim 5 wherein said neonatal rodent pups are identified by at least one of increased total active sleep time, increased active sleep as a percentage of total sleep time, decreased quiet sleep time and increased sleep fragmentation.

7. The method of claim 1 further including confirmation of said identification in adult rodent animals, said confirmation including a subsequent collection of physiological electrographic data from said adult rodents, said data selected from the group consisting of electroencephalograms (EEG), electromyograms (EMG) and combinations thereof.

8. A method of using neonatal rodent pups to identify adult rodent phenotypes, said method comprising:
   providing neonatal rodent pups and recording electromuscular activities in said rodent pups by electromyography;
   assigning a sleep-wake state to each said electromuscular activity, said sleep-wake state selected from the group consisting of active sleep, quiet sleep and wake;
   identifying an adult rodent phenotype in said neonatal rodent pup corresponding to at least one said assigned sleep-wake state; and
   confirming said phenotype with a subsequent test on adult rodents matured from said neonatal rodent pups.

9. The method of claim 8 wherein each said sleep-wake state is assigned comparing neonatal and adult populations of test rodents with, respectively, neonatal and adult populations of control rodents.

10. The method of claim 8 wherein said assigned sleep-wake state further includes sleep fragmentation.

11. The method of claim 10 wherein said phenotype is identified by at least one of increased total active sleep time, increased active sleep as a percentage of total sleep time, decreased quiet sleep time, and increased sleep fragmentation.

12. A method of using sleep-wake states to characterize abnormal sleep phenotype in mammals, said method comprising:
   providing a population of control mammals and a population of test mammals, said test mammals having an abnormal sleep phenotype relative to said control mammals;
   collecting physiological electrographic data from each said population;
   assigning sleep-wake states to said collected electrographic data;
   comparing said assigned sleep-wake states of said test mammals with said assigned sleep-wake states of said control mammals; and
   identifying differences between each said assigned sleep-wake states characteristic of said test mammal abnormal sleep phenotype.

13. The method of claim 12 wherein said electrographic data is selected from the group consisting of an EEG, an EOG, an EMG and combinations thereof.

14. The method of claim 12 wherein said sleep-wake states are selected from the group consisting of wake, active sleep, quiet sleep, light slow wave sleep, and deep slow wave sleep.

15. The method of claim 12 wherein said control mammals are Wistar rats and said test mammals are Wistar Kyoto rats.

16. The method of claim 12 wherein said differences in assigned sleep-wake states are selected from the group consisting of increased active sleep and increased sleep fragmentation.

17. The method of claim 12 wherein said test mammals are adult rodents identified as neonatal rodent pups having an abnormal sleep phenotype.

18. The method of claim 17 wherein said phenotype is identified in said neonatal rodent pups by recording electromuscular activities by electromyography, and assigning a sleep-wake state to each said electromuscular activity.

* * * * *

UNITED STATES PATENT AND TRADEMARK OFFICE
CERTIFICATE OF CORRECTION

PATENT NO. : 6,477,408 B1  Page 1 of 1
DATED : November 5, 2002
INVENTOR(S) : Fred W. Turek and Christine Dugovic It is certified that error appears in the above-identified patent and that said Letters Patent is hereby corrected as shown below:

Column 2,
Line 51, "(+S.E.M.)" should be -- (±S.E.M.) --

Column 3,
Line 12, "(α2:" should be -- (ß2: --

Column 8,
Line 56, "p21 0.0001)" should be -- p<0.0001) --

Signed and Sealed this

Eleventh Day of November, 2003

JAMES E. ROGAN
*Director of the United States Patent and Trademark Office*